United States Patent
Koch et al.

(10) Patent No.: US 7,151,259 B2
(45) Date of Patent: Dec. 19, 2006

(54) METHOD FOR OPERATING AN OPTOELECTRONIC SENSOR DEVICE

(75) Inventors: Carsten Koch, Dahlenburg (DE); Semih Akisoglu, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/095,557

(22) Filed: Apr. 1, 2005

(65) Prior Publication Data

US 2005/0224713 A1 Oct. 13, 2005

Related U.S. Application Data

(63) Continuation of application No. PCT/EP03/10033, filed on Sep. 10, 2003.

(30) Foreign Application Priority Data

Oct. 1, 2002 (DE) ................ 102 45 912

(51) Int. Cl.
- H01L 25/065 (2006.01)
- G01J 5/02 (2006.01)
- H04N 3/14 (2006.01)
- H04N 5/33 (2006.01)

(52) U.S. Cl. ............ 250/332; 250/341.8; 348/305; 348/370

(58) Field of Classification Search ........ 250/332, 250/339.06, 339.11, 341.8; 348/296, 297, 348/305, 370

See application file for complete search history.

(56) References Cited

U.S. PATENT DOCUMENTS

| | | | |
|---|---|---|---|
| 6,021,210 A * | 2/2000 | Camus et al. | 348/370 |
| 6,614,472 B1 | 9/2003 | Yamashita | |
| 2001/0005225 A1 | 6/2001 | Clark et al. | |
| 2002/0113209 A1 | 8/2002 | Sauer et al. | |
| 2003/0209893 A1 * | 11/2003 | Breed et al. | 280/735 |

FOREIGN PATENT DOCUMENTS

| | | |
|---|---|---|
| DE | 100 18 366 A1 | 10/2001 |
| DE | 100 62 977 A1 | 6/2002 |
| EP | 1 091 571 A2 | 4/2001 |
| EP | 1 091 571 A3 | 4/2001 |
| JP | 10336531 | 12/1998 |

OTHER PUBLICATIONS

"Shutter Operations for CCD and CMOS Image Sensors", Image Sensor Solutions, Eastman Kodak Company, Oct. 23, 2001, Revision 1, pp. 1-5.
German Search Report.
International Search Report.

* cited by examiner

Primary Examiner—David Porta
Assistant Examiner—Frederick F. Rosenberger
(74) Attorney, Agent, or Firm—Crowell & Moring LLP

(57) ABSTRACT

A method for operating a spatial-resolution opto-electronic sensor device is provided. In order to produce a computed image of the surroundings, the sensor surface is activated as a sequence of n-tuples of pairs from activation intervals and assigned subsets of sensor elements in such a way that, within an n-tuple, n subsets of sensor elements are activated during n activation intervals under different lighting conditions for the surroundings caused by appropriate control of the lighting source, and fields recorded within an n-tuple are processed with one another in a data-processing device.

10 Claims, 2 Drawing Sheets

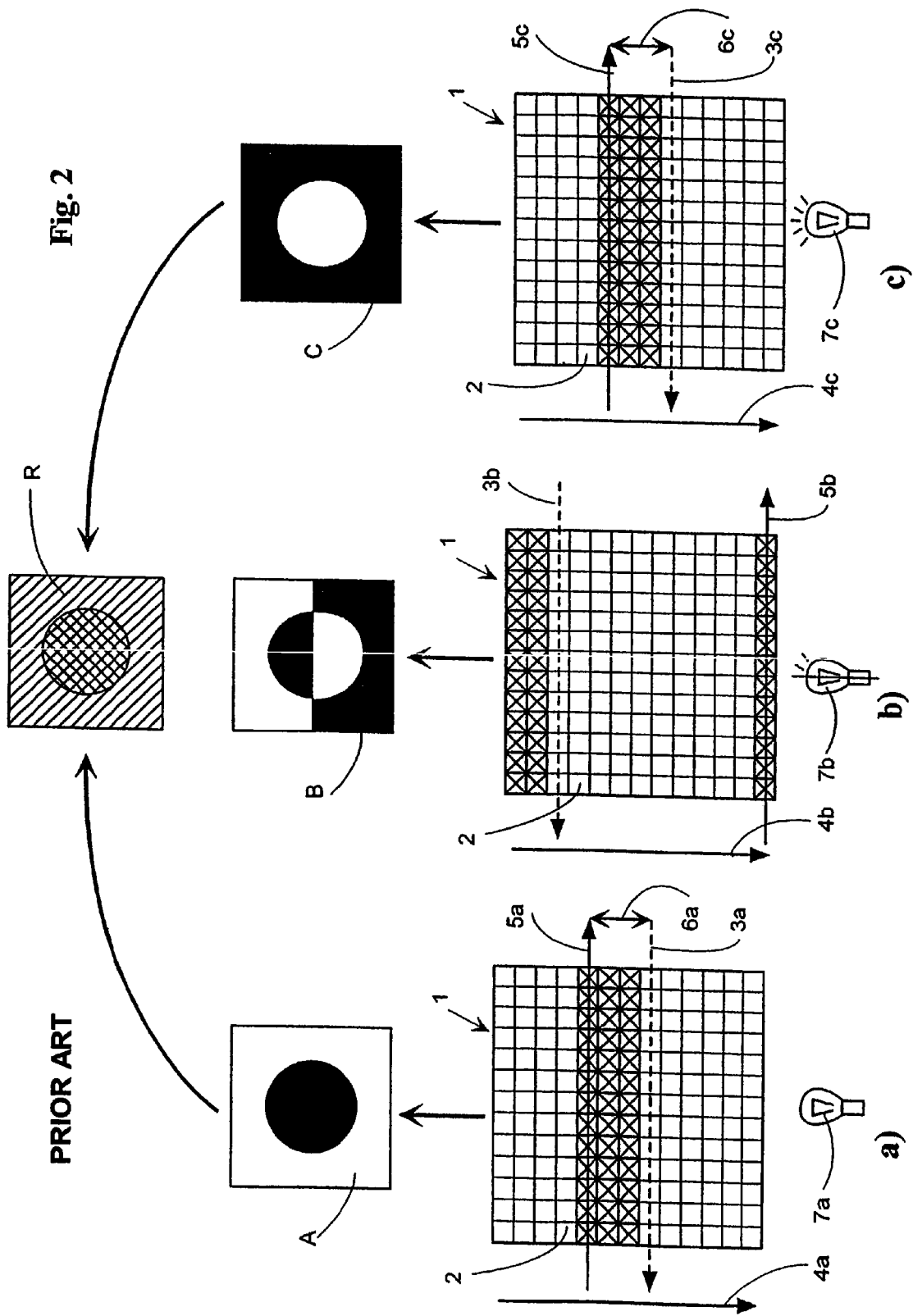

METHOD FOR OPERATING AN OPTOELECTRONIC SENSOR DEVICE

Figure 1:
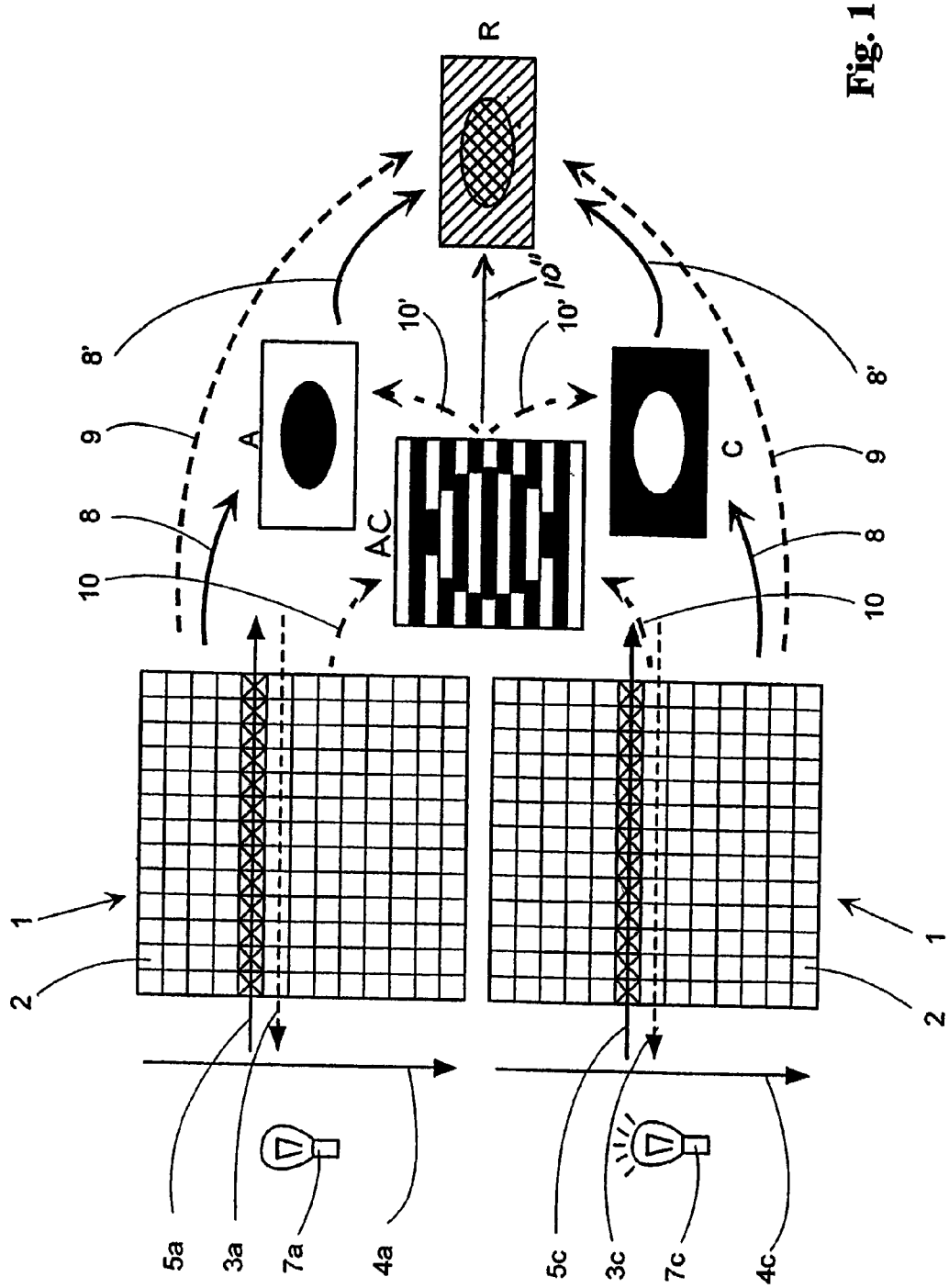

The present application is a continuation of PCT Application No. EP2003/010033, filed Sep. 10, 2003, and claims priority under 35 U.S.C. § 119 to German Application No. 102 45 912.6, filed Oct. 1, 2002, the entire disclosure of the aforementioned documents is herein expressly incorporated by reference.

BACKGROUND AND SUMMARY OF THE INVENTION

The present invention relates to a method for operating an opto-electronic spatial-resolution sensor device with a sensor surface comprising a large number of photosensitive sensor elements and with a photographic lens system which reproduces a spatial light distribution in surroundings it captures on the active sensor surface, wherein a subset of sensor elements activated in each case for the duration of an assigned activation interval for the integration of incident light to produce a corresponding field of the surroundings, and with a lighting device which is synchronized with the activation intervals to illuminate the surroundings captured by the photographic lens system at least in time and area with light of a wavelength range that can be integrated by the sensor elements.

This kind of method, and these kinds of opto-electronic sensor devices, are generally known from the area of digital imaging. The special control of the sensor elements is referred to as a "rolling shutter", wherein this expression can refer both to the control method and to a correspondingly operated sensor device. The theoretical operation of the rolling shutter will be first described below.

Digital cameras for recording a rapid sequence of images often work with a matrix-like sensor with a sensor surface which consists of a large number of sensor elements arranged in rows and columns. For the sake of simplicity, in this description of the prior art, reference is made only to these kinds of sensor devices although other arrangements of sensor elements are possible.

A photographic lens system reproduces a spatial light distribution on the sensor surface. In the individual sensor elements, usually special semiconductor arrangements, the striking photons cause isolated electrons to be produced, which are stored in an assigned reservoir over the exposure time of the sensor element. This is called the integration of the striking light in the sensor elements. Following the exposure time, the sensor elements are read out, i.e., the number of stored electrons is determined in spatial reference to the corresponding sensor elements as a measure of the incident photons during the exposure time. Using a data-processing unit which has suitable means of processing such as, for instance, means of digitizing, storing, calculation, etc., a digital representation of the data recorded can be produced which is generally called an "image". The different points in the image corresponding to the positions of the sensor elements in the sensor surface are called pixels. The digital representation of all the sensor elements used is called the frame.

The sensor elements are reset each time to provide a defined exposure time, which corresponds to emptying the electron reservoir. The exposure time is ended by the re-emptying of the reservoir during read-out. In the context of this application this entire interval is called the activation interval.

The rolling shutter is a special sequence of reset and read-out processes which makes possible a particularly rapid sequence of images. The reset, and therefore, the start of the exposure time for the sensor elements involved, occur each time by row and column in a predetermined cycle, so that all rows and columns are reset successively and in accordance with their spatial arrangement. Therefore, the exposure time for each row and column begins at a different point in time. With a constant offset of one or more rows or columns, the sensor elements are also read out by rows or columns. The exposure time is determined by the amount of the offset between reset and read-out during a predetermined reset and read-out time, i.e., during a predetermined dwell time of the process in a row or column.

The maximum exposure time corresponds to one frame time, i.e., the time required to read out one frame; the minimum exposure time corresponds to the time required to read out one row or column. As long as the exposure time is within these limits, the image sequencing rate is independent of exposure time.

When there is an offset of several columns or rows, there is an overlap between consecutive frames, with the last rows or columns of the preceding frame not having been read out while the first rows or columns of the following frame have already been reset. Accordingly, images can be produced in a continuous manner, which leads to very rapid image sequencing.

On the other hand, this overlap conceals the problem of the inadequate separation of individual frames. In most multimedia applications, this is unnoticeable. However, in measurement arrangements in which different frames have to be compared or processed with one another in some other way, this can lead to difficulties.

A method for monitoring the inside of a motor vehicle is known, for example, from German Patent Document Number DE 100 62 977 A1, in which two images of the inside of a motor vehicle are taken from the same sensor position under different lighting conditions and then subtracted from each other in terms of pixels. The different lighting conditions are produced by appropriately controlling a lighting source for illuminating the monitored inside area so that the lighting source is turned on when one image is captured and turned off when the other image is captured. The subtraction serves to eliminate the background light, i.e. the so-called offset reduction.

The aforementioned patent document does not provide information regarding the special control of the sensor device. However, it would have been particularly desirable to implement such applications with rolling shutter sensor devices because these are the most widely commercially available, and hence, the most cost-effective systems. However, if one wanted to perform this kind of measurement using the conventional rolling shutter method, one could only either reduce the row offset to one row and trigger the lighting source with the frame time, or keep a multi-row offset and discard one overlapping frame between one illuminated and one unilluminated frame. However, the frame time of the computed images, i.e., the time offset between the images with pixel values corresponding to the difference in the corresponding pixels of the original images taken, would be doubled or tripled. This cannot be tolerated for many measuring applications in which rapid processes have to be tracked such as, for example, in the optical control of passive safety systems like airbags.

German Patent Document DE 100 18 366 A1 discloses a method in which a rolling shutter camera is used to monitor the inside of a motor vehicle. In this method a lighting source is triggered with the shutter movement, i.e., the movement of the reset and read-out row over the sensor surface, so that it produces light spots in the monitored space at exactly the time at which those sensor elements are active on which these light spots would have been reproduced in a previously defined nominal condition, e.g., an empty vehicle. An image of the nominal condition is stored for comparison with images currently being taken. If due to a change in the nominal condition, e.g., the entry of a person into the space, the light spots produced are not reproduced on the predetermined sensor elements, this can be ascertained by comparison with the reference image.

The disadvantage to this method is that it is limited to comparing the current situation with a static predetermined condition. There is no evaluation of dynamic processes. In addition, the method actually uses only an extremely small part of the available sensor elements to obtain information, i.e., only those sensor elements on which the light spots generated are reproduced in the nominal condition. The activation of the other sensor elements that is necessary for technical reasons only brings disadvantages in terms of time.

It is an object of the present invention to provide a generic method in such a way that rapid dynamic processes can also be captured using standard commercial rolling shutter sensor devices.

This object is achieved by a spatial-resolution optoelectronic sensor device with a sensor surface comprising a large number of photosensitive sensor elements, and with a photographic lens system which reproduces spatial light diffusion in a surroundings it captures on the sensor surface, wherein a subset of sensor elements is activated in each case for the duration of an assigned activation interval for the integration of incident light to produce a corresponding field of the surroundings, and with a lighting device which is synchronized with the activation intervals to illuminate the surroundings captured by the photographic lens system at least in time and area with light of a wavelength range that can be integrated by the sensor elements, wherein producing a computed image of the surroundings is achieved by activating the sensor surface as a sequence of n-tuples of pairs from activation intervals and assigned subsets to produce a computed image of the surroundings in such a way that n subsets of sensor elements are activated each time within an n-tuple during n activation intervals under different lighting conditions of the surroundings caused by appropriate control of the lighting source, and fields recorded within an n-tuple are processed with one another in a data-processing device.

With this approach it becomes possible to produce n images within one frame time, which represent essentially the same scene under different lighting conditions, and which can be processed with one another in terms of pixels for further evaluation of the situation. The pixels to be processed with one another each time are recorded in immediate chronological proximity. This minimizes errors arising from the recorded scene changing between the exposures of the pixels corresponding to one another in the fields. Accordingly, with the present invention it also becomes possible to examine dynamic processes in which the scene changes within orders of magnitude of time that are not large vis-a-vis the frame time, as must be the case with conventional methods.

In accordance with the present invention, the spatial resolution of the n images recorded during one frame time is reduced compared with a full frame, i.e., an image with one pixel for each sensor element of the sensor surface. Each sensor element contributes to only one of the n images.

Apart from that, the n images recorded of essentially the same scene occurring within one frame time are indeed recorded according to the present invention at a minimum interval of time. However, because n spatially different subsets of sensor elements are activated in each n-tuple, slightly different points of the scene are reproduced in the mutually corresponding pixels of the n fields of an n-tuple.

The reduction of spatial resolution and that each sensor element contributes to only one of the n images is not problematic because in practice the resolution of standard commercial sensor elements far exceeds the resolution required for measurement. Specifically, an artificial reduction in resolution is often necessary for rapid image processing. Because the lens system can be adapted to the requirements for measurement, and can therefore also have a lower resolution than the sensor surface, adjacent sensor elements are essentially exposed to the same light incidence and can be practically regarded as pixels of the same scene point.

In accordance with one aspect of the present invention, spatially adjacent subsets of sensor elements are activated within one n-tuple. If the n subsets of sensor elements activated within one n-tuple are in spatial proximity, the spatial offset is minimized so that the differences in the pixels to be processed with one another derive almost exclusively from the different lighting during the particular activation interval.

Within an n-tuple with n>2, this allows the spatially adjacent subsets of sensor elements to be activated in a time sequence which does not correspond to their spatial arrangement. But it is particularly beneficial to activate the spatially adjacent subsets of sensor elements during chronologically sequential activation intervals. Accordingly, it is ensured that the mutually corresponding pixels of the n fields are at a minimal distance from one another in space and time.

In accordance with another aspect of the present invention, the sensor surface comprises a sensor element matrix arranged in rows and columns. This type of sensor is the most common form of sensor, and is, therefore cost-effective. The later processing of the data obtained with this kind of sensor is also particularly simple because the spatial position of each sensor element simply results from the combination of the corresponding row and column.

The subset of sensor elements activated during an activation interval can correspond to a small number of rows or columns in the sensor element matrix, or can correspond to exactly one row or exactly one column.

This provides particularly close agreement in time and space of the n fields of an n-tuple.

It is especially advantageous if all activation intervals have basically the same duration. This makes it easier to control the sensor device. The activation intervals corresponding to one another in the n-tuples in terms of their lighting conditions should at least be of the same length. It may be useful, however, to design activation intervals with different lengths in an n-tuple when there are different lighting conditions.

There are basically three ways to have the fields of one n-tuple processed with one another in time. First, they can be processed in such a way that n images of the surroundings are first produced, in each case, from those fields of all n-tuples of a frame which were recorded in equivalent lighting conditions and these are processed with one another. This requires intermediate storage of the n images. This method is especially useful if there are to be several computer steps which have to capture at least one of the n images in each case. Second, it is also possible to have processing take place immediately after activation. In this method only the data read out from one or a few subsets of sensor elements have to be temporarily stored in the interim. Only the processing result is then constructed as an image, i.e., the computed image. This method is useful, for example, with simple computations such as pixel subtraction in the n=2 case. Finally, it is also possible to produce a combination image of the surroundings first from all fields of all n-tuples of a frame and to have its pixels processed with one another according to their assignment to the n-tuples. This variation requires the smallest change in the control of a conventional rolling shutter sensor device.

To achieve a minimum offset in time and space of the pixels or sensor elements to be processed with one another, and for reasons of higher computing speed, less storage space and reduced loss of resolution, applications in which n=2 are preferred over higher n-tuples.

In many applications such as, for instance, monitoring the inside of a motor vehicle, it is desired that the user be as unaware as possible of the device being used. It is therefore desirable to use a lighting source that emits radiation invisible to the human eye. One particularly preferred form of the present invention is therefore distinguished in that the lighting source emits light in the infrared range.

The method of the present invention can be converted preferably by suitable programming of the control of standard commercial sensor devices, with hardware adaptations being able to be performed as needed and/or other components being able to be provided.

Further details on the invention are derived from the following detailed description and appended diagrams in which preferred embodiments of the invention are illustrated.

BRIEF DESCRIPTION OF THE DRAWING FIGURES

FIG. 1 illustrates a schematic diagram for illustration of the method of the invention; and FIG. 2 illustrates a schematic diagram for illustration of a rolling shutter based on the prior art.

DETAILED DESCRIPTION OF THE INVENTION

FIG. 2 illustrates a schematic diagram intended to illustrate a rolling shutter according to the prior art. For the sake of clarity, only sensor surface 1 of a sensor device is shown which consists of individual sensor elements 2 arranged in rows and columns like a matrix. Normally a standard commercial sensor device comprises several thousand sensor elements 2. For the sake of clarity, a sensor surface 1 with only 13×13 sensor elements 2 is illustrated in FIG. 2.

The partial representations a), b) and c) in FIG. 2 illustrate symbolically three stages of data recording in their time sequence during the operation of the sensor device.

Stage a) is the recording of a first full image. For this purpose a row of sensor elements is reset and incident light for integration is thereby activated. The reset function is symbolized by the broken-line arrow 3a. Sensor elements 2 which are activated and integrate incident light, e.g., by collecting free electrons produced by the incident light in the semiconductor material of the sensor, are symbolically identified with an x. All rows of sensor surface 1 are successively reset, which is illustrated by arrow 4a. Figuratively speaking, the reset row 3a moves over the entire sensor surface 2.

At a distance of a few rows—three rows in the embodiment shown—there follows a read-out row, i.e., the corresponding sensor elements 2 in this row are read out and digitized, and their corresponding values are stored. The read-out function is symbolized by the arrow 5a. The two-way arrow 6a, which marks the distance between reset 3a and read-out 5a, also stands for the exposure time. If the reset and read-out rows are in fact moved with a constant distance and a constant dwell time at each position in the direction of arrow 4a over sensor surface 1, the spatial distance between reset and read-out row also corresponds to the time interval during which sensor elements 2 can integrate incident light.

If all rows are read out and the values of the sensor elements stored with their spatial arrangement being preserved, there is a first full image or a first frame A. Subsequent frames B and C are recorded in the same way.

Stage b) illustrates a special situation when passing from the recording of first frame A to the second frame B. While a row still belonging to frame A is read out (arrow 5b), several rows belonging to frame B (above reset row 3b) are already being activated and are integrating incident light. This does indeed cause a rapid image sequencing. But if successive images are to be recorded in different lighting conditions and later processed with one another, this inadequate separation between the frames is a drawback. In fact, frame B, during the recording of which the lighting change takes place, cannot be used for measuring purposes and must be discarded. The frame time for a computed image R, which results from processing the clearly illuminated frames A and C with each other, therefore corresponds to triple the frame time for conventional recordings (single frame time), which is considerably too long for most measuring requirements, especially since the time interval between two pixels to be processed with each other amounts to two single frame times. In FIG. 2, different lighting conditions are symbolically represented by the switched off light bulb 7a and the switched on light bulb 7c. The divided light bulb 7b symbolizes a lighting change during the recording of frame B. In practice, different lighting conditions are created, for example, by a lighting source being switched on and off at predetermined times linked to the cycling of the frame frequency, and the surroundings captured by the recording lens being iluminated at times.

The indicated disadvantage of the large time interval between frames A and C to be processed with each other can only be gradually removed by reducing the at one time active subset of sensor elements 2 to a single row and thereby minimizing the exposure time. It is then not necessary to record the overlapping frame B. The frame time for a computed image R does not always, however, amount to twice the single frame time and the time interval of the recordings of two pixels to be processed with each other amounts to a full (single) frame time.

FIG. 1 illustrates a symbolic representation of a preferred form of the method of the invention which allows measurement observation of rapid, dynamic processes using standard commercial sensor devices. As with the conventional rolling shutter, rows of pixels are activated by reset 3a, 3c. The corresponding sensor elements 2 integrate incident light up to read-out process 5a, 5c. In the embodiment shown, the at one time active subset of sensor elements is reduced to exactly one row. The resulting short exposure time does not constitute a disadvantage in brightly illuminated applications such as, for example, in the brightly lit inside of a motor vehicle.

As illustrated by light bulbs 7a and 7c, the lighting source is synchronized with the row advance in such a way that each two successively activated rows of sensor elements 2 integrate light under different lighting conditions. In practice this can be achieved, for example, by triggering the lighting source, e.g. a light-emitting diode or a diode laser which preferably emit light in the near-infrared range, with the vertical row trigger of the sensor device. The pixels read out within such a double (2-tuples) of consecutive activation intervals are used to construct two different fields A and C. Fields A and C therefore have a halved vertical resolution, whereas the horizontal resolution remains unchanged. Fields A and C essentially represent the same scene under different lighting conditions. Fields A and C are both formed during only one single frame time, with pixels corresponding to one another in terms of their position being recorded at a time interval of only one row. If the pixels read out were to be assembled according to their position on sensor surface 1 to form a single full image AC, this would correspond to a conventional full image with a full vertical resolution but with successive rows that were recorded under different lighting conditions, as is illustrated symbolically in FIG. 1 as frame AC.

As discussed above, the loss in vertical resolution does not constitute an essential disadvantage because the number of sensor elements 2 in standard commercial sensor devices far exceeds the requirements of most measurement applications. Suitable adapatation of the resolution of the lens system can also make sure that the spatial offset by one row that exists between the mutually corresponding pixels of fields A and C is negligible in the further processing of the image.

In addition to the recording and assignment principle of the method of the invention, FIG. 1 shows, by examples and symbolically, three possible variations of image processing following recording. The clearest is the path of operation marked with the continuous arrows 8, 8': the rows read out within an activation interval double are used to construct different frames A and C, for example, by alternately storing them in different storage areas of a data-processing unit, as is indicated with arrows 8. In a subsequent computation step, frames A and C are then processed with each other in terms of pixels, e.g., by pixel subtraction, formation of a scaled difference or calculation of a pixel value ratio, wherein the frames A and C pixels corresponding to each other in terms of their position in each case are included with each other to give a pixel value which, while retaining the position, contributes to the construction of the computed or result frame R.

It may, however, be better to forego the construction of frames A and C and to immediately include with each other the rows read out within an activation interval double and to directly construct result frame R, as is symbolized with the broken-line arrow 9. This variation is especially useful for simple computations in which there is no need to resort many times to the original data for frames A and C.

Finally, it is also possible to store the pixels read out in a combination frame AC simply according to their original position on the sensor surface (arrow 10) without taking into account their assignment to one of fields A and C, and only afterwards to split them up into fields A and C (arrow 10') or to process them directly by row with each other (arrow 10"). This variation is advantageous because it requires the smallest changes in the control of a standard commercial sensor device.

It is also possible to perform activation and read-out in higher n-tuples than pairs of two. This opens up the possibility of more complex calculations and using more than two different lighting conditions. The subsets thereby activated each time also do not have to be single rows. Accordingly, it is possible to select columns, multiples of rows or columns or entirely different forms of subsets, with the latter being particularly useful in sensor devices with directly controllable sensor elements 2.

A preferred application of the method of the invention is the monitoring of the inside of a motor vehicle. A CMOS-based digital camera is installed at a location in the vehicle inside to be monitored and has a lens system that reproduces surroundings of interest on the sensor surface of the camera. Surroundings of interest may be, for example, the entire inside of the vehicle (in anti-theft systems for instance) or special reference points the movement of which must be detected (in optical airbag control for instance). An infrared light source illuminates these surroundings at least in areas, with their being triggered in time, for example, by the row advance signal from the camera. The recording and processing of two or more images each time to produce a computed image on which an automatic decision process can be based, can, for example, be required if distorting factors such as, for instance, natural sunlight have to be eliminated.

The present invention is not limited to the examples of embodiment shown, of course. Many other advantageous variations are conceivable within the scope defined by the claims.

What is claimed is:

1. A method for producing a computed image, the method comprising the acts of:
   activating a lighting source during a first activation interval;
   activating a first subset of sensor elements of an opto-electronic sensor for a duration of the first activation interval;
   storing a first image produced by the activation of the first subset of sensor elements;
   activating a second subset of sensor elements of the opto-electronic sensor for a duration of a second activation interval;
   storing a second image produced by the activation of the second subset of sensor elements;
   processing the first and second stored images to produce the computed image;
   activating a third subset of sensor elements of the opto-electronic sensor for a duration of a third activation interval; and
   storing a third image produced by the activation of the third subset of sensor elements, wherein the computed image is produced by processing the first, second and third stored images,
   wherein lighting conditions are different during each of the first, second and third activation intervals.

2. The method according to claim 1, wherein sensor elements of the first and second subsets of sensor elements are spatially adjacent.

3. The method according to claim 1, wherein the opto-electronic sensor includes a surface which comprises a matrix of sensor elements arranged in rows and columns.

4. The method according to claim 3, wherein the first and second subset of sensor elements correspond to rows or columns of sensor elements in the matrix of sensor elements.

5. The method according to claim 1, wherein the act of processing includes pixel subtraction, scaled difference formation and/or ratio formation.

6. The method according to claim 1, wherein the lighting source emits light in an infrared range.

7. The method according to claim 1, wherein the opto-electronic sensor is a CMOS image sensor.

8. The method of claim 1, wherein the first, second and third activation intervals have a same duration.

9. The method of claim 1, wherein the first, second and third activation intervals have a different duration.

10. The method of claim 1, wherein each of the first, second and third images has a resolution less than a resolution of the opto-electric sensor.

* * * * *